Sept. 3, 1957 D. A. WALSH ET AL 2,805,357
OBTURATOR PROBE FOR CONTROL OF CARBON ARC LIGHTS
Filed Nov. 16, 1953

INVENTORS
DAVID A. WALSH
THEODORE H. PROJECTOR
WILLIAM F. MULLIS

BY Walter S. Pauf.
ATTORNEYS

United States Patent Office 2,805,357
Patented Sept. 3, 1957

2,805,357

OBTURATOR PROBE FOR CONTROL OF CARBON ARC LIGHTS

David A. Walsh, Takoma Park, and Theodore H. Projector, Forest Glen, Md., and William F. Mullis, Vienna, Va.; said Projector and said Mullis assignors to the United States of America as represented by the Secretary of the Navy Application November 16, 1953, Serial No. 402,194

6 Claims. (Cl. 314—20)

(Granted under Title 35, U. S. Code (1952), sec. 266)

The invention described herein may be manufactured and used by or for the Government of the United States of America for governmental purposes without the payment of any royalties thereon or therefor.

This invention relates to a control device for carbon arc searchlights to automatically maintain the tip of the positive carbon at the focal position of the optic and to shield the positive head of the arc mechanism from the heat of the arc.

The automatic focusing of carbon arc lights has generally been accomplished by one of two methods. In the first, an image of the positive carbon tip is projected by a small lens or mirror onto a suitable sensing element such as a bimetallic strip or a photoelectric cell. The optical system is such that as the carbon burns, the image traverses the sensing element. By proper disposition of the sensing element and its associated circuits, the feed of the carbon thus can be adjusted to restore the carbon to its correct position. The second method, known as probe control, is based on a device which senses the position of the positive tail flame of the arc. The tail flame is fairly well defined, particularly in the region close to the carbon, and is fixed in position with respect to the tip of the positive carbon. It is also highly ionized and has fairly steep voltage gradients at its boundaries. Thus the position of the tail flame, and consequently the tip of the carbon, may be sensed readily by a probe of a suitable conductive material placed near an edge of the tail flame. These methods of focus control have not been satisfactory since there is considerable thermal inertia in the mechanism of the first method, the probes of the second method required periodic replacement, and both methods required constant adjustment.

An object of the present invention is to provide a probe for automatic focus control of carbon arc searchlights which will not deteriorate from the heat of the arc.

Another object of the present invention is to provide a probe for automatic focus control of carbon arc lights which has practically no thermal inertia and which functions satisfactorily for the brief periods required of anti-submarine searchlights.

Another object of the present invention is the provision of an obturator-probe for automatic focus control of carbon arc lights which will retain effective control of the focus in the most unstable or deflected condition of the arc.

A further object of the present invention is to provide a probe for automatic focus control of carbon arc lights which does not require any adjustment.

An additional object of the present invention is to provide an obturator-probe for control of carbon arc lights which senses the position of the positive tail flame and shields the positive drive mechanism from the heat of the arc.

Still other objects and features of the invention will become apparent to those skilled in the art from the following description of the preferred embodiments of the invention and from the accompanying sheet of drawings in which.

Figure 1:
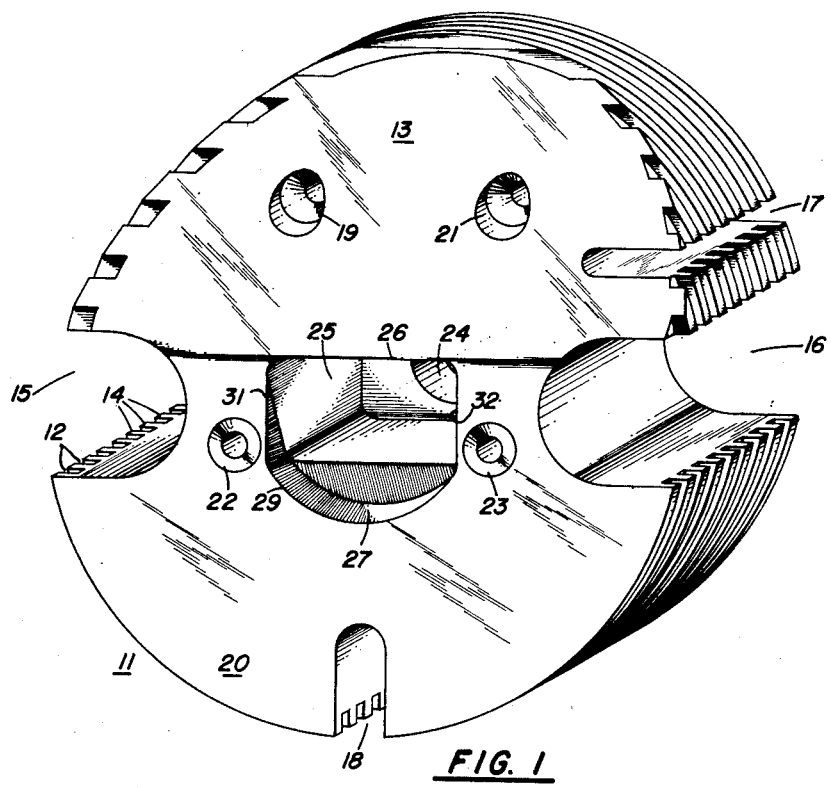
Fig. 1 is a perspective view of a preferred embodiment of the invention.
Figure 2:
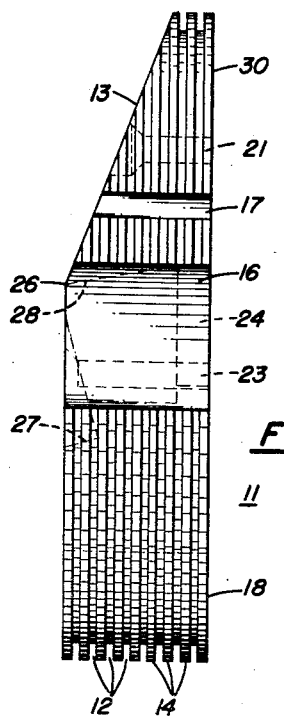
Fig. 2 is a side view of the obturator probe of Fig. 1.

Referring more particularly to the drawings, the obturator-probe consists of a cylinder 11 of material of high-thermal conductivity, such as copper or silver. The upper portion of the front face 20 of the cylinder is tapered rearwardly as at 13. A plurality of spaced peripheral grooves 12 surround the cylinder and define the fins 14 which facilitate the conduction of heat to the atmosphere by increasing the contact area. The cylinder 11 is provided with four grooves 15, 16, 17 and 18 and four countersunk holes 19, 21, 22 and 23, all of which extend between the front face 20 and the rear face 30. A recess 25 is formed in the front face 20 of the cylinder 11 and extends to a considerable depth therein, the rear wall of the recess 25 being connected with the rear face 30 by opening 24. The upper wall 28 of the recess 25 is undercut, as shown in dotted line in Fig. 2, and the lower wall 29 and side walls 31 and 32 are milled out to form an additional recess 27, the longitudinal axis of which is at an angle of approximately 16° with that of the recess 25. The upper wall 28 and the tapered portion 13 of the front face join to form a straight, sharp edge 26 which extends across the width of recess 25.

In operation, the cylinder 11 is securely mounted on and electrically insulated from the positive head of a search light by means of screws or bolts passed through the holes 19, 21, 22 and 23. The horizontal support rods of the positive head pass through grooves 15 and 16 and electrical leads and control rods pass through grooves 17 and 18. The present invention is designed for installation on existing equipment and is mounted in place of the usual obturator, so grooves 15, 16, 17 and 18 are necessary to prevent interference with various elements of the existing equipment. In installing the present invention, the control characteristics of the probe in the arc of the search light are determined and the installation design is fixed. The obturator-probe is then securely mounted in accordance with the installation design and no further adjustment or alignment is necessary. After the obturator-probe is in position, the positive carbon extends through the opening 24 and recess 25 and protrudes beyond the front face 20. The edge 26 serves as the probe in this invention and the positive carbon is adjusted until the edge 26 lies at the edge of the positive tail flame, the probe (edge 26) then senses the position of the positive tail flame and consequently the tip of the positive carbon and acts as the usual probe in energizing a relay to maintain the positive carbon in position.

The obturator-probe of the present invention is made of a material of high thermal conductivity and is massive in construction to permit absorption of heat from the arc and rapid conduction of the heat to the atmosphere, thus shielding the drive mechanism of the positive head from the heat generated by the arc. This operation is the reverse of that of the usual obturator which is generally formed of a highly heat-resistant material which insulates the positive head from the heat of the arc. The present invention is considerably thicker than the usual obturator, this increased thickness serving to increase the thermal capacity of the present invention and to position the probe (edge 26) adjacent the end of the positive carbon when it is at the focal position of the search light.

The probe of the present invention (edge 26) is not subject to early deterioration as are the probes in present use. Previous efforts at overcoming this defect of the probe system of focus control have concentrated on the use of materials of high melting point, but in the thin rods used, the heat conducting path away from the tip was restricted to a small cross-section and the extreme heat of the arc caused rapid deterioration of the probe through melting, evaporating or burning. The design of the present invention concentrates on removing the heat of the arc rather than withstanding it. The use of a material of high thermal conductivity allows the heat absorbed by the probe of the present invention to be conducted rapidly away. Since the probe of the present invention is effectively one edge of a cubic volume, the heat may be conducted away from the effective control point in many directions with a large equivalent cross-section. Thus the use of an obturator-probe of large mass and volume provides thermal capacity to absorb the energy and large surface area which may be used to get rid of the energy.

A further advantage of the present invention lies in the use of an edge rather than a pointed tip as the control. If the arc should become unstable and the position of the positive flame should be changed to one side or the other, the edge probe control remains effective although there may be a slight loss of accuracy. Such displacements of the flame cause greater inaccuracies in both the thermo-optical method and in the rod-probe method, and if the displacement is great enough may result in complete loss of control. Complete loss of control cannot occur with the present invention even in the most unstable or deflected condition of the arc, since the arc is effectively completely surrounded by the controlling element.

The undercut wall 28 and the tapered portion 13 define a sharp edge for the probe but are not essential to successful operation of the present invention. The recess 27 permits the use of a douser, which conceals afterglow of the carbons, without interference with the obturator probe, but it likewise is not essential to the operation of the present invention.

The natural cooling of the obturator-probe is effective for low duty cycle arcs such as encountered in aircraft mounted antisubmarine searchlights, but for longer operating periods, forced air or liquid cooling may be utilized.

Obviously many modifications and variations of the present invention are possible in the light of the above teachings. It is, therefore, to be understood that within the scope of the appended claims the invention may be practiced otherwise than as specifically described.

What is claimed is:

1. A combination obturator and probe for focus control of carbon arc lights comprising a single massive piece of material of high thermal conductivity adapted to be affixed to and electrically insulated from the positive head of a carbon arc light; an opening in said material from back to front to permit passage of a positive carbon therethrough; and a recess in the front face of said material around said opening, the upper leading edge of said recess being straight and sharp, whereby the mass of the material effectively conducts heat away from the positive head and the upper leading edge of the recess serves as a probe for sensing the position of the positive tail flame of the arc.

2. An obturator-probe for focus control of carbon arc lights comprising a single massive cylinder of material of high-thermal conductivity adapted to be affixed to the positive head of a carbon arc light; an opening in said cylinder from back to front to permit passage of a positive carbon therethrough; and a recess in the front face of said cylinder surrounding said opening, the upper leading edge of the recess being straight and sharp, whereby the mass of the cylinder effectively conducts heat of the arc away from the positive head and the upper leading edge of the recess serves as a probe for sensing the position of the positive tail flame of the arc.

3. An obturator-probe for focus control of carbon arc lights comprising a single massive cylinder of copper having a flat rear face adapted to be affixed to the positive head of a carbon arc light; an opening in the approximate center of said cylinder extending from back to front to permit passage of a positive carbon therethrough; and a recess in the front face of said cylinder surrounding said opening, the upper leading edge of the recess being straight, whereby the mass of the cylinder effectively conducts heat of the arc away from the positive head and the upper leading edge of the recess serves as a probe for sensing the position of the positive tail flame of the arc.

4. An obturator-probe for focus control of carbon arc lights comprising a single massive cylinder of copper having a flat rear face and a front face a portion of which tapers toward said rear face, said rear face being adapted to be affixed to the positive head of a carbon arc light; an opening in the approximate center of said cylinder extending from back to front to permit passage of a positive carbon therethrough; and a recess in the front face of said cylinder surrounding said opening, the upper leading edge of said recess being defined by the lower edge of said tapered portion, said upper leading edge being straight, whereby the mass of the cylinder effectively conducts heat of the arc away from the positive head and the upper leading edge of the recess serves as a probe for sensing the position of the positive tail flame of the arc.

5. A combination obturator and probe for focus control of carbon arc lights comprising a block of material of high thermal conductivity adapted to be affixed to the positive head of a carbon arc light, an opening in said block to permit passage of a positive carbon therethrough, said block having two generally plane faces thereon oriented in the direction of the arc, said faces being angularly disposed to each other.

6. A combination obturator and probe for focus control of carbon arc lights comprising a block of material of high thermal conductivity adapted to be affixed to the positive head of a carbon arc light, an opening in said block to permit passage of a positive carbon therethrough, said block having two generally plane surfaces thereon oriented in the direction of the arc, said surfaces meeting adjacent to said opening.

References Cited in the file of this patent
UNITED STATES PATENTS

| | | |
|---|---|---|
| 1,642,436 | Fraser | Sept. 13, 1927 |
| 2,065,891 | Hall | Dec. 29, 1936 |
| 2,091,818 | Kiefer | Aug. 31, 1937 |